(12) United States Patent
Guichard et al.

(10) Patent No.: US 10,232,530 B2
(45) Date of Patent: Mar. 19, 2019

(54) INDUCTION HEATING DEVICE AND METHOD FOR MAKING A WORKPIECE USING SUCH A DEVICE

(75) Inventors: Alexandre Guichard, La Chapelle du Mont du Chat (FR); José Feigenblum, Grenoble (FR)

(73) Assignee: ROCTOOL, Le Bourget du Lac (FR)

( * ) Notice: Subject to any disclaimer, the term of this patent is extended or adjusted under 35 U.S.C. 154(b) by 643 days.

(21) Appl. No.: 13/275,928

(22) Filed: Oct. 18, 2011

(65) Prior Publication Data

US 2012/0128809 A1    May 24, 2012

Related U.S. Application Data

(63) Continuation-in-part of application No. 11/993,159, filed as application No. PCT/FR2006/050338 on Apr. 11, 2006, now abandoned.

(30) Foreign Application Priority Data

Jun. 22, 2005    (FR) ...................... 05 51717

(51) Int. Cl.
*B29C 35/12*    (2006.01)
*H05B 6/10*    (2006.01)
*B29C 35/08*    (2006.01)

(52) U.S. Cl.
CPC ......... *B29C 35/0805* (2013.01); *H05B 6/105* (2013.01); *B29C 2035/0811* (2013.01)

(58) Field of Classification Search
CPC ............. B29C 33/06; B29C 2035/0811; B29C 35/0805; H05B 6/105; G06K 9/00208

(Continued)

(56) References Cited

U.S. PATENT DOCUMENTS 3,928,744 A * 12/1975 Hibino ................... H05B 6/062
                                                          219/621
4,549,056 A * 10/1985 Okatsuka ............... H05B 6/062
                                                          219/624

(Continued)

FOREIGN PATENT DOCUMENTS

CN    1453376    11/2003
CN    1504065    6/2004

OTHER PUBLICATIONS

International Search Report dated Sep. 25, 2006.

(Continued)

*Primary Examiner* — Tu B Hoang
*Assistant Examiner* — Diallo I Duniver
(74) *Attorney, Agent, or Firm* — Im IP Law; C. Andrew Im; Chai Im

(57) ABSTRACT

The invention concerns a device for heating a surface by induction, in particular for molding or transforming a part made of thermoplastic or thermosetting composite material. The device comprises a body having at least one portion made of magnetic and heating conducting material wherein is provided a plurality of closed cavities proximate the surface to be heated, each cavity surrounding a field winding. The heat produced by induction on the walls of the cavity is transferred by conduction to the heating surface. The distance between the cavities and the position of said cavities relative to the heating surface are such that the heating is substantially uniform on said surface.

7 Claims, 3 Drawing Sheets

(58) Field of Classification Search
USPC ........ 219/603–605, 632, 634–638, 647, 725, 219/609, 618; 264/486–487, 402–405, 264/431–432, 457–458, 462, 472, 264/474–481, 489, 491–492; 425/3, 425/174.8 R See application file for complete search history.

(56) References Cited

U.S. PATENT DOCUMENTS

| | | | |
|---|---|---|---|
| 4,649,249 A * | 3/1987 | Odor | 219/659 |
| 5,483,043 A | 1/1996 | Sturman | |
| 5,571,436 A | 11/1996 | Gregg | |
| 5,844,212 A * | 12/1998 | Dickens et al. | 219/621 |
| 5,916,469 A * | 6/1999 | Scoles et al. | 219/633 |
| 6,717,118 B2 * | 4/2004 | Pilavdzic | B29C 45/74 219/601 |
| 6,747,253 B1 * | 6/2004 | Firth et al. | 219/634 |
| 2003/0226839 A1 * | 12/2003 | Matsen et al. | 219/634 |
| 2004/0222566 A1 | 11/2004 | Park | |
| 2004/0256382 A1 | 12/2004 | Pilavdzic et al. | |
| 2005/0000959 A1 * | 1/2005 | Kagan | 219/660 |

OTHER PUBLICATIONS

Chinese Office Action with English Translation dated Mar. 15, 2010.
Office Action dated Oct. 6, 2010 for U.S. Appl. No. 11/993,159, filed Dec. 19, 2007.
Office Action dated May 18, 2011, for U.S. Appl. No. 11/993,159, filed Dec. 19, 2007.

* cited by examiner

INDUCTION HEATING DEVICE AND METHOD FOR MAKING A WORKPIECE USING SUCH A DEVICE

This application is a continuation in part of co-pending U.S. application Ser. No. 11/993,159 which is incorporated herein as reference.

The invention relates to a method and a device for heating a metal surface by induction, in particular in order to carry out a molding or transformation operations for the mass production of workpieces made of thermoplastic or thermosetting matrix composite materials.

To heat a metal surface in order to carry out the molding of a workpiece made of plastic or composite material, there is a known way of burying inductive wires in a volume of resin or the like, the heating surface in contact with the workpiece being formed by a plate made of magnetic material, this plate being called a "susceptor". The heating is obtained by electromagnetic coupling between the inductors and the magnetic plate, the eddy current induced by the inductors running through the "susceptor" and producing heat.

This technology has major drawbacks that make it difficult to exploit. Indeed, the heating of the susceptor is not homogeneous because it is maximum at the position of each inductive wire and diminishes between these positions. Furthermore, since resin is a thermal insulator it is not easy to obtain the cooling necessary between two duty cycles. Furthermore, the heating and cooling cycles may alter the mechanical properties of this resin. Finally, resin has low resistance to impact. Therefore the temperature of the heating surface cannot be set homogeneous unless sufficient heating time is allowed between each heating and cooling cycles. Temperature differences on the heating surface during the molding or transformation of material comprising a matrix made of plastics leads to cosmetic defects, like white spots on the surface of said workpiece, or in some instance, may also lead to structural defects because of matrix viscosity variations during the stamping of laminated composite materials.

The invention overcomes these drawbacks and allows to get very quickly an homogeneous temperature on the heating surface.

The device of the invention comprises:

a body having at least one part made of a heat-conductive material, with a plurality of closed cavities proximate to the heating surface, each cavity having walls surrounding an inductor said walls being at least partly made of a magnetic material, where the heat produced by induction on the part of the walls made a of magnetic material is transferred by conduction to the heating surface. Thus, the magnetic material making up at least part of the walls of the cavities is chosen to be efficiently heated by induction. Such an efficient heating depends on the electrical resistivity of said magnetic material, the higher the resistivity the higher the heating for the same current crossing it. However a higher electrical resistivity comes with a lower thermal conductivity and the lower the thermal conductivity the longer the time required to get a uniform temperature. According to the invention the walls of the cavities being made of a magnetic material are efficiently heated by induction, said walls transmit their heat to the body which thermal conductivity is high and allows for making the temperature uniform over the heating surface. The heating of the surface is uniform, and the efficiency is high since the coupling between each inductor and the corresponding cavity is optimum, with the cavity completely surrounding the inductor. Furthermore, the material of the body of the heating surface may be less sensitive to ageing than a resin.

Since the material constituting the body of the device is a thermal conductor, the cooling can also be done efficiently.

In one embodiment, the heat-conductive material making part of the body comprises steel.

In one embodiment, the body comprises two parts:
a first layer comprising the heating surface, said layer being made of a heat conductive material;
a bottom layer fixed to the first layer on the side opposite the heating surface;
the cavities extending through the interface between the first and the second layer.

In one embodiment the cavities are dug into the first layer of the previous embodiment.

In one embodiment the walls of the cavities dug in the first layer being made of a non-magnetic material of the previous embodiment are plated with a magnetic material.

In one embodiment, the first layer of the previous embodiment is made of a copper based alloy and the walls of the cavities are coated with a layer of nickel.

In another embodiment each cavity is formed by the association of two grooves, one groove being formed in the first layer made of magnetic heat conductive material and the other groove being formed in the bottom layer, said bottom layer being made of a non-magnetic material.

In one embodiment, the device comprises conduits for the circulation of a cooling fluid between the cavities and the heating surface.

According to another embodiment, the inductor has a section smaller than that of each cavity of the plurality of closed cavities so as to form a ring-shaped space for the circulation of a cooling fluid between two heating cycles of the heating surface.

The invention also concerns a molding or transformation apparatus comprising:

a first device for heating a first heating surface by induction, comprising:
a first body having at least one part made of a heat-conductive material, with a plurality of closed cavities proximate to the heating surface, each cavity having walls surrounding an inductor said walls being at least partly made of a magnetic material,
where the heat produced by induction on the magnetic part of the walls of the cavity is transferred by conduction to the heating surface, a second device for heating a second heating surface by induction comprising:
a second body having at least one part made of a heat-conductive material, with a plurality of closed cavities proximate to the heating surface, each cavity having walls surrounding an inductor said walls being at least partly made of a magnetic material,
where the heat produced by induction on the magnetic part of the walls of the cavity is transferred by conduction to the heating surface.

Other features and advantages of the invention shall appear from the description of some of its embodiments, this description being made with reference to the appended drawings, of which:

Figure 1:
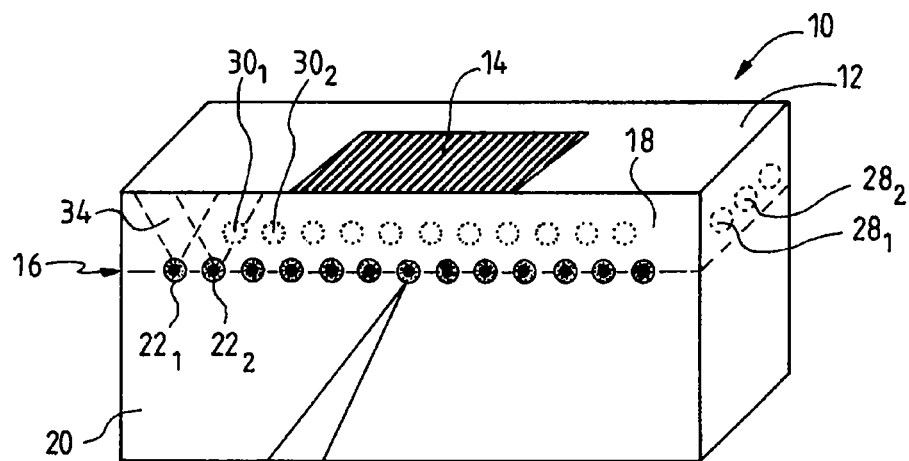
FIG. 1 is a drawing of a device according to the invention.

In the example shown in FIG. 1, the device 10 constitutes the half portion of a mould for the shaping and/or transformation of a workpiece by heating. Thus, in this example, the device 10 forms the lower part of a mould, the upper part of which is not shown.

In this device 10, it is therefore necessary to heat the upper face 12, also referred as the heating surface, in order to transform or to mold a workpiece 14.

According to the invention, the heated surface 12, is part of a body 16 which, in the example, is made of two layers, 18 and 20 respectively. According to one embodiment these two layers 18, 20 are made of steel. The part 18 is made of magnetic steel, e.g. low carbon steel or ferritic stainless steel, while the part 20, the bottom layer, is made of non-magnetic material, for example also steel, e.g. austenitic stainless steel.

According to this embodiment, the first layer 18, made of a magnetic material, is the one comprising the heating surface 12. The lower portion of this part 18, which has a generally parallelepiped shape in the example, has circular, square or rectangular sectioned grooves with identical grooves of the bottom layer 20 of the body 16 corresponding to them. Thus, when the part 18 and 20 are assembled as shown, the grooves form channels or cavities $22_1$, $22_2$, etc. each of which is designed to hold an electrical conductor 24, for example made of copper, which is crossed, for the heating, by an alternating current at high frequency, for example a frequency ranging from 100 to 200 KHz, in order to induce an electromagnetic field.

Figure 2:
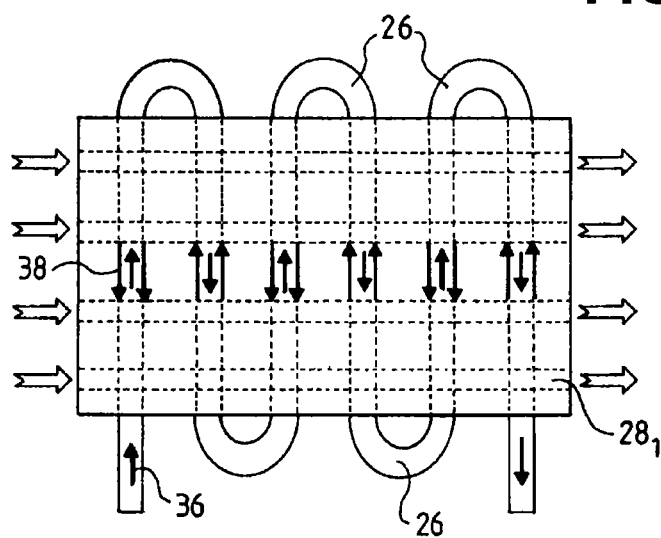
FIG. 2 is a top view of a device shown in FIG. 1.

As can be seen in FIG. 2, the various conductors 24 can be connected to one another by jumpers 26.

In the example shown in FIG. 1 and FIG. 2, the magnetic part 18 of the body 16 is crossed by channels $28_1$, $28_2$, etc. having a general direction perpendicular to the channels $22_1$, $22_2$. These channels $28_1$, $28_2$, . . . are designed to receive a cooling fluid between two heating cycles. As a variant, there may be provided cooling channels $30_1$, $30_2$ having a direction substantially parallel to the cavities $22_1$, $22_2$, etc.

In another variant, which shall be described further below with FIG. 3, the cooling is done in the cavities 22.

Figure 1A:
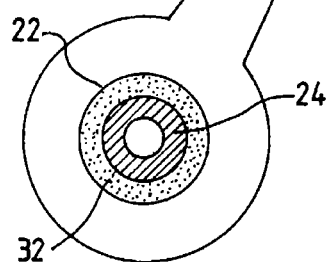
FIG. 1a shows a part of the device shown in FIG. 1.

In the example shown in FIGS. 1 and 1a, the conductor 24 is tubular so as to bring about a circulation of fluid for cooling the conductor, and it is insulated from the internal walls of the cavity 22 by a ring-shaped and insulating layer 32.

The working is as follows:

The high-frequency current, whose intensity is of the order of 10 KHz to 200 KHz, crosses the conductor 24 and produces an electromagnetic field which, by coupling, heats the walls of the magnetic part of the cavity. The coupling is perfect since the cavity completely surrounds the conductor. Thus, losses are minimized.

The heat produced on the walls of the cavity is propagated to the surface 12 in a diffusion zone 34 having a substantially conical shape.

The distance from the cavities to the surface 12 and the distance between two adjacent cavities must be such that, on the surface 12, the diffusion zones 34 form an intersection so that the temperature of the surface 12 remains uniform.

However, in order to minimize heat losses, the distance from the cavities to the surface 12 should not be excessive.

The heat losses toward the rear, i.e. in the part 20 of the body 16, are minimized because the heat produced is produced by the magnetic part of the cavity and not by the non-magnetic part.

As shown in FIG. 2, the inductive currents 36 induce currents in opposite directions in the cavity.

Figure 3:
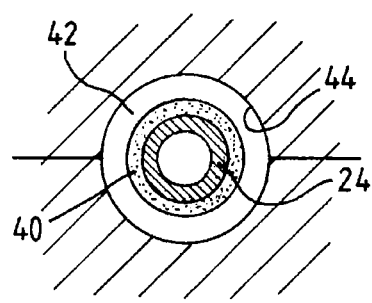
FIG. 3 is a drawing showing an alternative embodiment of the cooling means for the device shown in FIG. 1, FIGS. 4, 5 and 6 are drawings of examples of molds according to the invention.

In the variant shown in FIG. 3, to optimize the heating, there is no provision for cooling conduits of the type shown in FIG. 1 but the cooling is obtained in each cavity. Thus, the cavities 22 may be closer to the surface 12 and there is no obstacle to the propagation of heat towards the surface 12.

The tubular conductor 24 is lined with an insulating layer 40 and the section of this insulated conductor has a dimension substantially smaller then the section of the cavity 22. Thus a ring-shaped space 42 is made between the conductor 24 and the internal surface 44 of the cavity and, in this ring-shaped space 42, a fluid, in particular a liquid, for cooling of the body 16 is made to flow between two heating cycles.

During the heating, the ring-shaped zone 42 is filled with air. This feature thermally insulates the cavity of the tube 24. In other words, the heat produced in the part 18 of the body 16 makes practically no contribution to heating the tube 24.

In one embodiment, the workpiece 14 to be processed has two surfaces that have to present different aspects. To this end, the upper part of the mould (not shown) has a device (not shown) similar to the device 10 described here above with a power supply to the inductors that is different from the power supply to the inductors of the lower device 10.

Thus, the heating temperature of the upper and lower parts may be different in order to give the different surface states.

This possibility of different temperatures is naturally not limited to different surface states. It may also entail, for example, the processing of parts made of materials that are different on each face.

Figure 4:
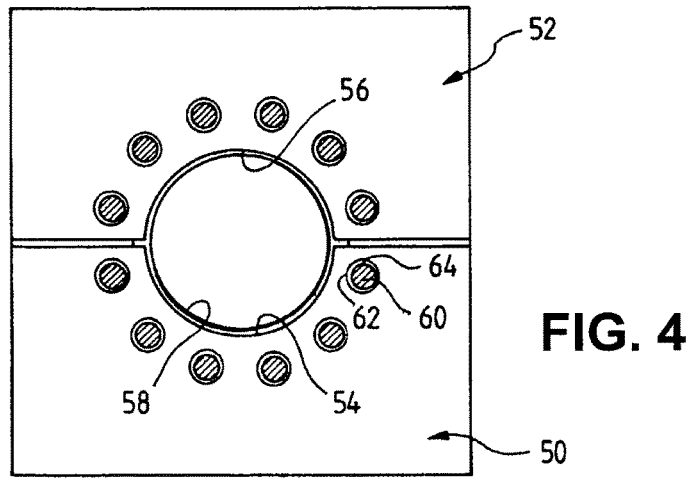

FIG. 4 is a view in section of a mould compliant with the invention and designed to make a tube.

This mould therefore has two devices 50 and 52, each having a semi-cylindrical cavity, respectively 54 and 56. These cavities are heated as described here above, in particular as described with reference to FIGS. 1 and 3. The material 58 to be shaped as a tube by the heating operation is applied by compressed air against the induction-heated walls 54, 56.

In each of the devices, the inductors are evenly distributed in a magnetic material around the surfaces 54, 56. Each of these inductors and the cooling means of the mould are of the type shown in FIG. 3, i.e., each copper conductor 60 is tubular to let a cooling fluid circulate within, and between this conductor 60 and the cavity 62 made of magnetic material, a ring-shaped space 64 is made, filled with air during the molding. In this space 64, a cooling fluid flows between two molding cycles.

Figure 5:
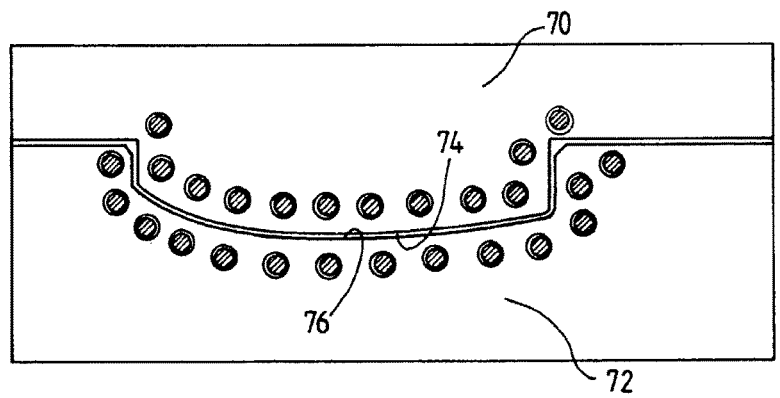

FIG. 5 is a view similar to that of FIG. 4 but pertains to the molding of a part made of composite material having, for example, the shape of an element of an automobile body such as a hood. In this case, there is provided a device 70 forming a punch and another device 70 forming a die. The inductors distributed in the vicinity of the molding surfaces, 74 and 76 respectively, so that, as described already, uniform temperatures are obtained on these surfaces.

Figure 6:
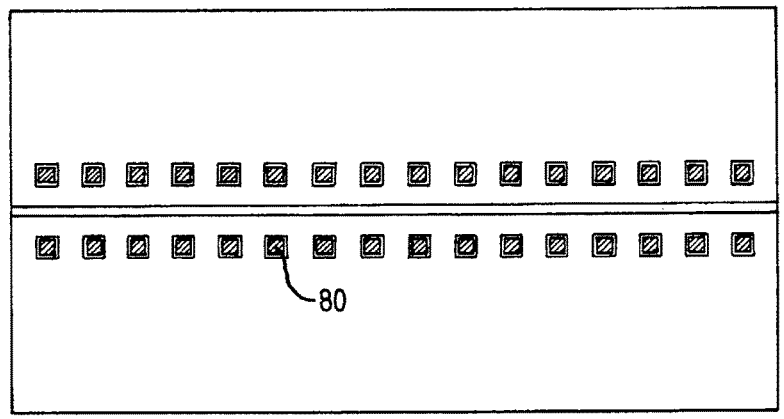

Finally, FIG. 6 represents a mould used to obtain a flat plate. This embodiment is distinguished from the one shown in FIGS. 4 and 5 by the fact that the conductors 80 have, in this case, a rectangular or square section and that similarly the cavities have a rectangular or square section.

Figures 7, 7A:
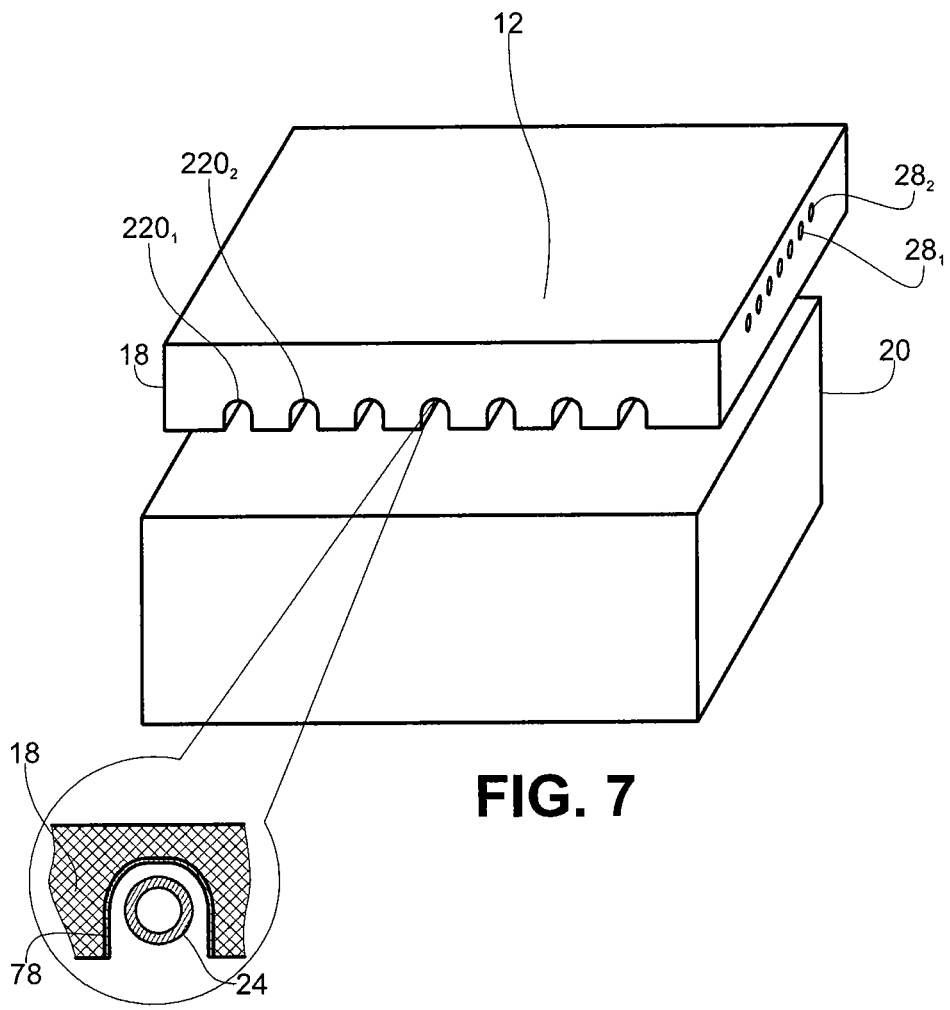
FIG. 7 shows an alternate embodiment of the device where the cavities are made by grooves in the first layer of the device.
FIG. 7a shows a detailed view of the grooves of the embodiment shown in FIG. 7.

FIG. 7 is an alternate embodiment, where the cavities $220_1$, $220_2$ containing the inductors are dug as grooves in the first layer 18 of the body. This embodiment allows to place the inductors very close to the heating surface 12 and therefore to achieve a quick heating of said heating surface 12. According to a specific embodiment, seen on the detailed view of FIG. 7a, the first layer 18 is made of a highly heat conductive material such as a copper or an aluminium alloy. As an example a copper-beryllium alloy is well suited for such an application. This kind of copper alloy is not magnetic and therefore cannot be heated by induction. In order to overcome this drawback, the inside walls of the grooves can be coated or plated with a magnetic material 78 such as nickel.

According to this embodiment the bottom layer 20 of the body is made of a non-magnetic steel. The main purpose of this bottom layer is to provide stiffness to the body. Using a non-magnetic material for this bottom layer avoids to heat the whole volume of the device. According to this embodiment, the magnetic layer 78 of the grooves $220_1$, $220_2$ is efficiently heated by induction and transmits the heat to the heat conductive copper alloy of the first layer 18 of the body. Because of the high thermal conductivity of the copper alloy, the temperature is quickly made uniform over the heating surface 12, although the distance between the bottom of the grooves $220_1$, $220_2$ is reduced.

The invention claimed is:

1. A device to carry out a molding or transformation of a workpiece made of thermoplastic or thermosetting composite material by induction heating, comprising:
a body comprising top and bottom layers made of metal, the top layer is made of a heat-conductive and non-magnetic-metallic material and comprises a heating surface contacting the workpiece to be transformed, and the body comprises a plurality of closed cavities extending in the top layer through an interface between the top and bottom layers, each cavity having walls surrounding an electrical conductor extending in the cavity, said electrical conductor produces a high frequency electromagnetic field when it is crossed by a high frequency alternating current with a frequency ranging from 100 kHz to 200 kHz, wherein the cavities are dug into the top layer, the walls of said each cavity being plated with a layer of a magnetic material at least in a part of said each cavity extending in the top layer, the plated magnetic layer being heated by induction by coupling with the high frequency electromagnetic field generated by the electrical conductor during heating, wherein the cavities comprising the electrical conductors are remote from the heating surface, a distance from the heating surface and a distance between two adjacent cavities are such that heat produced by induction in the plated magnetic layer in said each cavity is transferred by conduction to the heating surface in a diffusion zone, the distance from the cavities to the heating surface and the distance between two adjacent cavities are such that the diffusion zones form an intersection so that a temperature of the heating surface is uniform.

2. The device according to claim 1 wherein the heat-conductive material making part of the body comprises steel.

3. The device according to claim 1, wherein the top layer is made of a copper-based alloy and the wall of the cavities are plated with a layer of Nickel.

4. The device according to claim 1 wherein each cavity is formed by the association of two grooves, one groove being formed in the top layer being made of a magnetic heat conductive material and the other groove being formed in the bottom layer, said bottom layer being made of a non-magnetic material.

5. The device according to claim 1 comprising conduits for the circulation of a cooling fluid between the cavities and the heating surface.

6. The device according to claim 1, wherein the inductor has a section smaller than that of each cavity of the plurality of closed cavities so as to form a ring-shaped space for the circulation of a cooling fluid between two heating cycles of the heating surface.

7. A molding or transformation apparatus comprising:
a first device configured to mold or transform a workpiece made of thermoplastic or thermosetting composite material by induction heating, the first device comprising a first body comprising first top and bottom layers made of metal, the first top layer is made of a heat-conductive-metallic material and comprises a first heating surface;
the first body comprising a plurality of closed first cavities extending in the first top layer through an interface between the first top and bottom layers, each first cavity having first walls surrounding a first conductor, the first conductor producing a first high frequency magnetic field when it is crossed by a high frequency alternating current with a frequency ranging from 100 kHz to 200 kHz, said first walls being made of a magnetic material at least in a part of said each first cavity extending in the first top layer and are heated by induction by coupling with the first high frequency magnetic field generated by the first conductor during heating;
wherein the first cavities comprising the first conductors are remote from the first heating surface, a distance from the first heating surface and a distance between two adjacent first cavities are such that heat produced by induction on the part of the first walls made of the magnetic material in said each first cavity is transferred by conduction to the first heating surface in a first diffusion zone, the distance from the first cavities to the first heating surface and the distance between two adjacent first cavities are such that the first diffusion zones form an intersection so that a temperature of the first heating surface is uniform;
a second device configured to mold or transform the workpiece made of thermoplastic or thermosetting composite material by induction heating, the second device comprising a second body comprising second top and bottom layers made of metal, the second top layer is made of the heat-conductive-metallic material and comprises a second heating surface;
the second body comprising a plurality of closed second cavities extending in the second top layer through an interface between the second top and bottom layers of the second body, each second cavity having second walls surrounding a second conductor, the second conductor producing a second high frequency magnetic field when it is crossed by a high frequency alternating current with a frequency ranging from 100 kHz to 200 kHz, said second walls being made of the magnetic material at least in a part of the cavity extending in the second top layer and are heated by induction by coupling with second high frequency magnetic field generated by the second conductor during heating; and wherein the second inductors are remote from the second heating surface, a distance from the second heating surface and a distance between two adjacent second cavities are such that heat produced by induction on the part of the second walls made of the magnetic material is transferred by conduction to the second heating surface.

* * * * *